No. 878,312. PATENTED FEB. 4, 1908.
J. D. REED.
PORTABLE WEIGHING APPARATUS FOR FARM WAGONS.
APPLICATION FILED APR. 20, 1907.
4 SHEETS—SHEET 1.
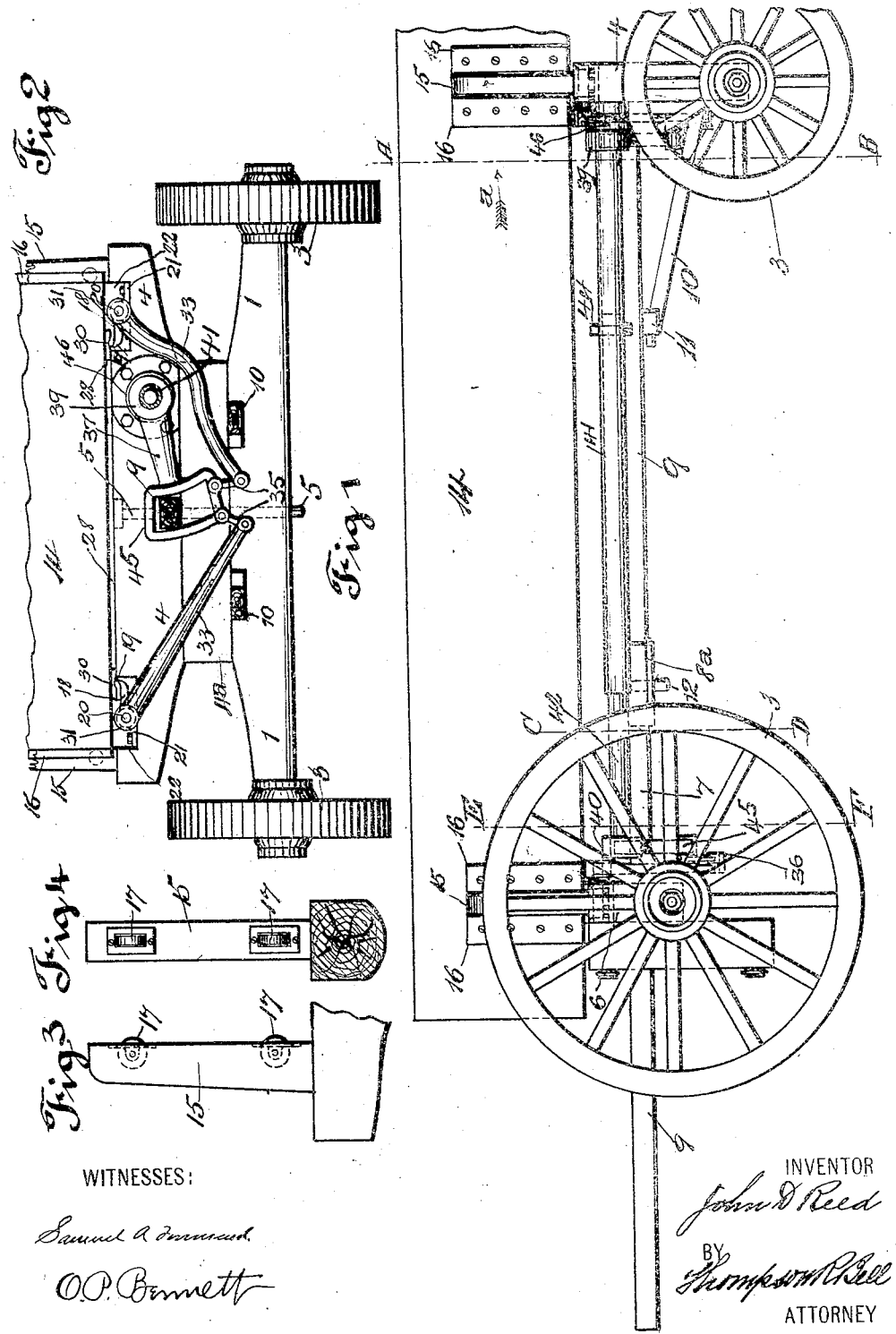
WITNESSES:
INVENTOR
John D Reed
BY
Thompson R Bell
ATTORNEY No. 878,312. PATENTED FEB. 4, 1908.
J. D. REED.
PORTABLE WEIGHING APPARATUS FOR FARM WAGONS.
APPLICATION FILED APR. 20, 1907.
4 SHEETS—SHEET 2.
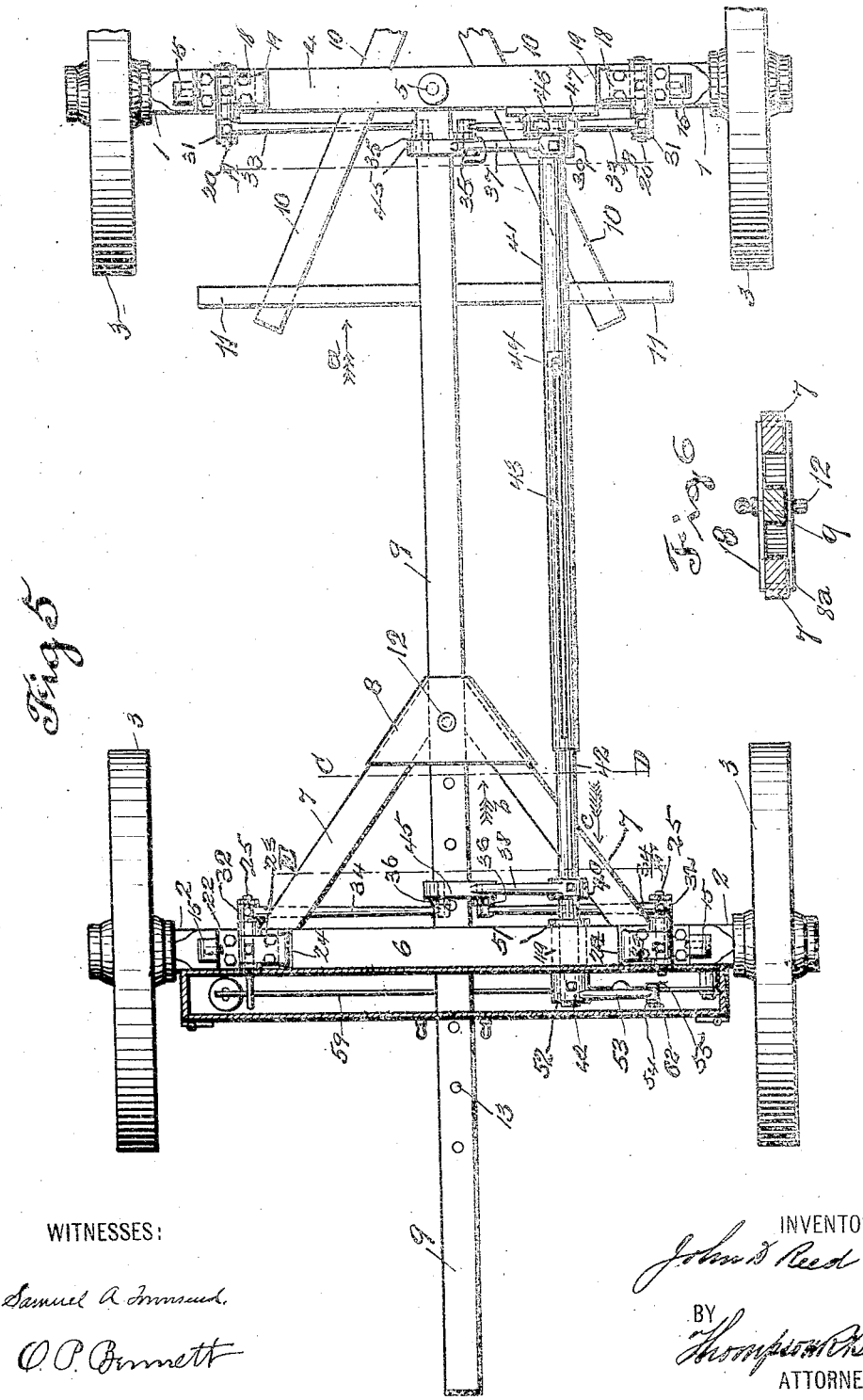
WITNESSES:
INVENTOR
BY
ATTORNEY No. 878,312. PATENTED FEB. 4, 1908.
J. D. REED.
PORTABLE WEIGHING APPARATUS FOR FARM WAGONS.
APPLICATION FILED APR. 20, 1907.
4 SHEETS—SHEET 3.
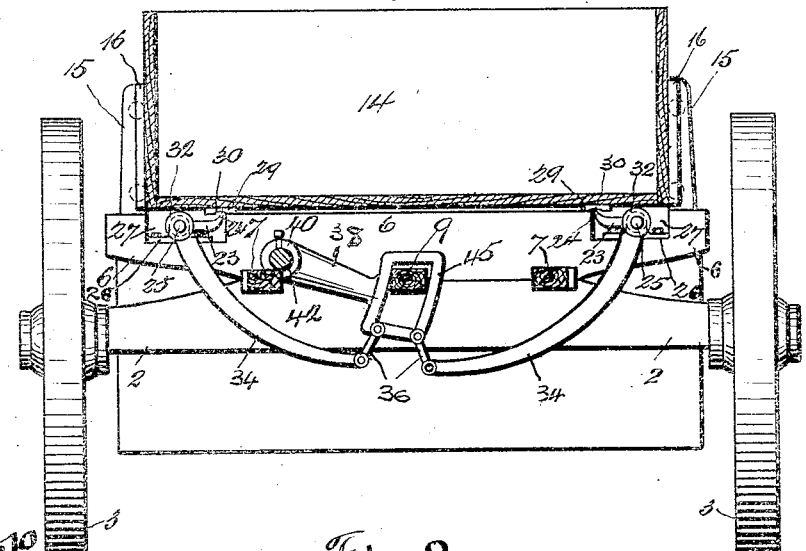
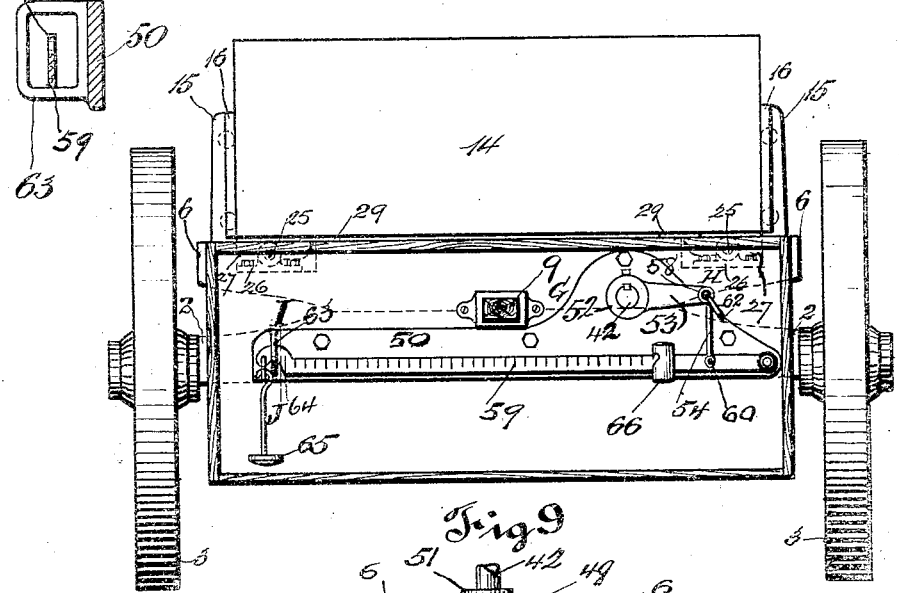
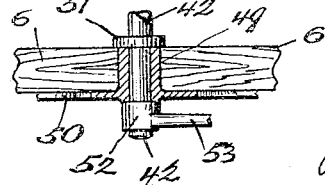
WITNESSES:
INVENTOR
John D Reed
BY
Thompson & Bell
ATTORNEY No. 878,312. PATENTED FEB. 4, 1908.
J. D. REED.
PORTABLE WEIGHING APPARATUS FOR FARM WAGONS.
APPLICATION FILED APR. 20, 1907.
4 SHEETS—SHEET 4.
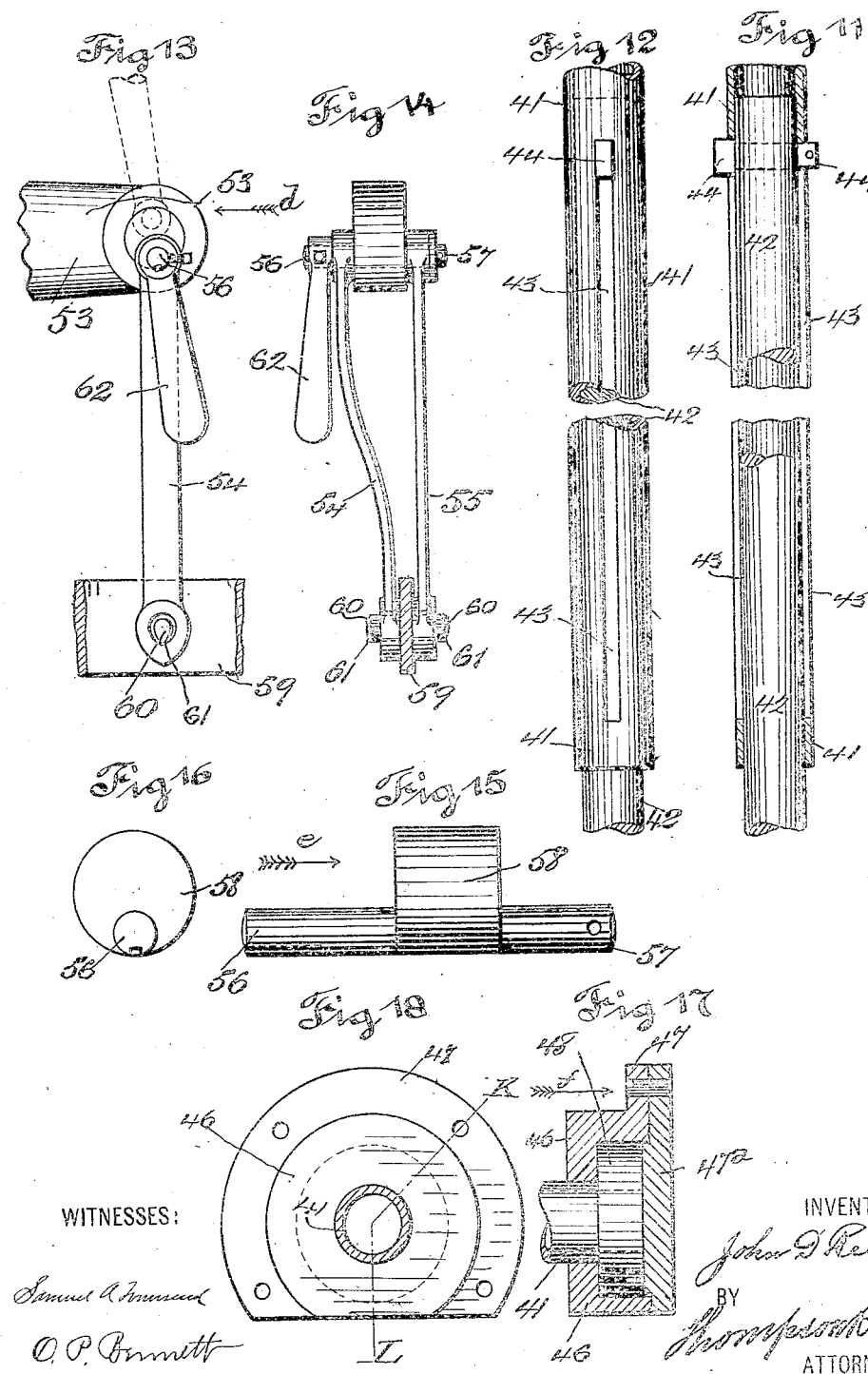

UNITED STATES PATENT OFFICE.

JOHN D. REED, OF GREENCASTLE, INDIANA, ASSIGNOR OF ONE-HALF TO EUSTACE B. HALLIDAY, OF ACTON, INDIANA.

PORTABLE WEIGHING APPARATUS FOR FARM-WAGONS.

No. 878,312.  Specification of Letters Patent.  Patented Feb. 4, 1908.

Application filed April 20, 1907. Serial No. 369,274.

*To all whom it may concern:*

Be it known that I, JOHN D. REED, citizen of the United States, residing at Greencastle, in the county of Putnam and State of Indiana, have invented certain new and useful Improvements in Portable Weighing Apparatus for Farm-Wagons, of which the following is a specification, reference being had therein to the accompanying drawing.

This invention relates to improvements in portable weighing means for wagons and it consists in the weighing apparatus hereinafter described and particularly pointed out in the claims.

The object of this invention is to provide a weighing apparatus that may be applied to that class of farm-wagon generally known as an extensible wagon, that is to say, a wagon that is capable of being lengthened or shortened at pleasure to suit the class of material to be transported from place to place. I attain these objects by means of the weighing apparatus illustrated in the accompanying drawings in which like numerals of reference designate like parts throughout the several views.

Figure 1 is a side elevational view of a farm-wagon of the extensible type showing my invention of a portable weighing apparatus applied thereto; Fig. 2 is a transverse sectional elevational view of the same taken along the line A. B. in Figs. 1 and 5, and looking in the direction of the arrow $a$; Fig. 3 is an enlarged detail side view of one of the standards for retaining the body of the wagon in position on the supporting bolsters thereof; Fig. 4 is a view of a face of the same showing the guiding friction rollers; Fig. 5 is a top view of the wagon; Fig. 6 is a detail sectional view taken along the line C. D. in Figs. 1, 5, 19, and 20, and looking in the direction of the arrow $b$; Fig. 7 is a transverse sectional elevational view of the wagon taken along the line E. F. in Figs. 1, 5, 19, and 20, and looking in the direction of the arrow $c$; Fig. 8 is a rear elevational view of the wagon showing the weighing beam of the apparatus; Fig. 9 is an enlarged detail broken sectional view of a portion of the weighing beam or scale bar plate, showing a portion of the end of the telescoping shaft and the bearing boss of said shaft taken along the line G. H. in Fig. 8; Fig. 10 is an enlarged detail sectional view of the scale-bar plate taken along the line I. J. in Fig. 8 and showing the scale bar guide; Fig. 11 is an enlarged broken detail sectional view of the center portion of the extensible shaft of the weighing apparatus; Fig. 12 is a view of the same showing the longitudinally extending slot of the tubular portion of said shaft; Fig. 13 is an enlarged detail side view of the suspension links for connecting the counter lever and the weighing or scale beam; Fig. 14 is an edge view of the same looking in the direction of the arrow $d$, in Fig. 13; Fig. 15 is an enlarged detail view of the eccentric-pin carrying arbor of the counter lever; Fig. 16 is an end view of the same looking in the direction of the arrow $e$, in Fig. 15.; Fig. 17 is a sectional view of the forward tubular shaft-bearing taken along the line K. L. in Fig. 18; and, Fig. 18 is a view of the same looking in the direction of the arrow $f$ in Fig. 17.

The running gear of the class of farm-wagon to which my invention of a portable weighing apparatus is particularly applicable is composed of the front and rear axles 1 and 2 upon the journal ends of which are mounted the wheels 3, the forward bolster 4 between which and the forward axle 1 is situated the shim or liner $4^a$ whereby the front portion of the body of the wagon is supported to be level or in the same plane as that of the rear portion, the rear bolster 6 situated on the top side of the rear axle 2 to extend longitudinally thereof, the rear braces 7 extending forwardly to support the top and bottom guide plates 8 and $8^a$, the coupling tongue 9, and the front tongue hounds or braces 10 which extend backwardly of the front axle 1 to support the brace 11 to the rear ends of which hounds the said brace is secured.

The shim $4^a$ is situated upon the top side of the axle 1 and is permanently secured thereto; said axle 1 and said shim $4^a$ resting upon it are pivotally connected to the bolster 4 to swing together by a bolt or center pin 5.

The rear bolster 6 is rigidly and permanently secured to the rear axle 2 upon which latter it rests.

The guide plates 8 and $8^a$ are secured to the braces 7 at their forward top and bottom sides at a distance between them to permit the rear end of the coupling tongue 9 to be passed between them, thus not only operating as a support for the rear end of said coupling tongue but also serving the purpose of a guide when moving the axles of the running gear of the wagon nearer to each other or further apart.

The coupling tongue guide plates 8 and 8ª are drilled to receive the coupling-pin 12 and the holes 13 are formed in the coupling tongue 9 and are adapted to register with the bores of the said coupling tongue guiding plates, so that when said coupling tongue is moved longitudinally to either lengthen or shorten the spread or reach of the wheels of the wagon, the coupling-pin 12 may be passed through the holes of the guiding plates 8 and 8ª and that hole of the coupling tongue registering with said guide plates coupling pin hole to lock the coupling tongue at any desired point of its length to prevent it moving longitudinally.

The body 14 of the wagon, when in its normal position, rests upon the forward and rear bolsters 4 and 6, and is held and maintained in position thereon by the standards 15 which are secured at their bottom ends to the bolsters 4 and 6.

The guide strips 16 are secured to the outer sides of the sides or wings of the body of the wagon in position thereon to extend vertically and sufficiently far apart to touch or almost touch the front and rear sides of said standards 15, and the said standards and the guiding strips are provided to coöperate to maintain the body of the wagon in position on its supporting bolsters.

On the inner faces of said standards are the friction bearing rollers 17 which are adapted to bear against the sides of the body of the wagon, so that said body may be more readily moved in a vertical direction between the said standards 15 when the weight of the said body and its contents are applied to the weighing apparatus.

I will now proceed to describe the weighing apparatus as applied to farm wagons and which is the essence of this invention.

The forward load carrying levers are composed of the shorter lever arms 18 and the longer lever arms 33. The shorter lever arms 18, having the knife bearing edges 19 adapted to bear in the grooves 30 of the plates 28 when the weighing apparatus is in operative gear, are keyed or otherwise secured to their arbors 20 to turn therewith, and said arbors are journaled in the bearings formed in the fulcrum plates 21 which plates are secured in the recesses 22 formed in the front bolster 4.

The arbors 20 are prolonged so that the bosses 31 of the longer lever arms 33 may be fitted and keyed or otherwise secured thereon to turn therewith.

The rear load carrying levers are similar to the forward load carrying levers and are also composed of the shorter lever arms 23 and the longer lever arms 34.

The shorter lever arms 23 are provided with the knife bearing edges 24 which are adapted to bear in the grooves 30 of the plate 29 and the said shorter lever arms are keyed or otherwise secured on the arbors 25 to turn therewith and said arbors are journaled in bearings formed in the fulcrum plates 26 which plates are secured in the recesses 27 formed in the rear bolster 6. The arbors 25 are also prolonged so that the bosses 32 of the longer lever arms 34 may be fitted and keyed or otherwise secured thereon to turn therewith.

The connecting links 35 and 36 connect the swinging looped ends 45 of the forward and rear lever arms 37 and 38 and the bosses 39 and 40 of which are keyed or otherwise secured to the extensible shaft.

The extensible balance shaft is composed of the tubular portion 41 and the rear telescoping portion 42. The tubular portion of the shaft is provided with the longitudinally extending key-ways or slots 43 which slots or key-ways are situated on diametrically opposite sides of the tubular portion 41 of the extensible shaft, and a key 44 is adapted to extend through the said key-way or slot to slide longitudinally of said slot, and said key is secured in the end of the telescoping solid portion 42 of said extensible shaft, so that the forward tubular portion and the rear telescoping portion of said shaft rotate together as if composed of one integral piece.

The looped end portions 45 of the coöperating lever arms 37 and 38 are provided for the purpose of permitting the coupling tongue 9 to pass through the plane of the sweep of said levers without obstructing or interfering with their movement.

The front end of the tubular portion 41 of the extensible-shaft is journaled in the bore of the boss 46 secured to the plate 47, and a collar 48 on the front end of said shaft 41 retains the latter in its bearing and prevents it from moving longitudinally in either direction.

The rear or solid telescoping portion 42 of said extensible shaft is journaled at or near its end in the bore of the boss 49 formed integral on the weighing beam plate 50 which plate is secured to the rear side of the rear bolster 6 and the rear axle 2 of the wagon.

A collar 51 formed integral on the telescoping shaft 42 near the rear end thereof prevents the said telescoping portion from moving longitudinally in one direction and the boss 52 of the counter lever 53, which boss is keyed or otherwise secured to said shaft on the rear side of the bolster, prevent said shaft from moving longitudinally in the opposite direction.

The depending links 54 and 55 are fitted on the eccentric-pins 56 and 57, formed integral on the ends of the eccentric 58 and depend therefrom to connect at their lower ends to the weight beam or scale beam 59. A pin 60 having a knife bearing edge 61 connects the lower ends of the depending links 54 and 55 to said weight or scale beam 59.

On the end of the longer eccentric pin 56 is secured a handle 62 which is provided for the purpose of rotating the eccentric 58 to elevate or lower the eccentric pins 56 and 57 to raise or lower the weight or scale beam 59 to place the weighing apparatus into or out of gear.

When the weighing apparatus is not required to be used to weigh the contents of the wagon it is readily released by turning the eccentric 58 to lower the eccentric pins 56 and 57, shown in Figs. 13 and 14, to permit the weight or scale beam 59 to drop sufficiently to exert no influence upon the weighing apparatus. The weight or scale beam 59, by the lowering of the eccentric pins 56 and 57, is dropped to such an extent as to receive sufficient play to permit its free guided weight end to drop to the bottom of its guide 63 to be supported thereby, this operation completely releases the counter lever 53 and the entire mechanism depending upon it and controlled by it, and permits the lever arms 18 and 23 to swing downwardly to permit the body of the wagon to descend and rest upon the front and rear bolsters 4 and 6.

When it is required to ascertain the correct weight of the contents of the wagon, the eccentric 58 is revolved by means of the handle 62 to raise the hooked free end of the weight or scale beam 59 off the bottom of the guide 63 whereby it is supported when not in operative position. Immediately the weight or scale beam 59 is moved into operative position the force applied to the end of the counter lever arm 53 by said weight or scale beam 59 moves the levers 57 and 58 upwardly, and these levers being connected to the levers 33 and 34 cause the levers 18 and 23 to swing upwardly to raise the body of the wagon off the front and rear bolsters 4 and 6. The entire load of the body of the wagon and its contents is transferred to the weighing apparatus and the correct weight thereof is ascertained by a proper manipulation of the weights on the weight carrier 65 and by moving the sliding weight 66 along the beam 59 in the direction required to ascertain the correct weight which is read off the scale on the beam 59.

I claim:—

1. In a portable weighing apparatus for wagons, the combination with forward and rear load carrying levers each composed of a shorter and a longer lever arm, said levers having their shorter arms situated to coöperate to support the body of the wagon, of an extensible shaft extending longitudinally of the wagon, coöperating lever arms on said extensible shaft operatively connected to the longer arms of said load carrying levers, a counter lever arm on said extensible shaft, and a weight indicating means connected to the latter.

2. In a portable weighing apparatus for wagons, the combination with forward and rear load carrying levers arranged in opposing pairs and each composed of a longer and a shorter lever arm, said levers having their shorter arms situated to coöperate to support the body of the wagon, an extensible shaft extending longitudinally of the wagon, coöperating lever arms on said extensible shaft connected to the longer arms of said load carrying levers, a counter lever arm on said extensible shaft, a weighing beam, and means connecting said weighing beam and said counter lever arm whereby the former may be disengaged from the weighing apparatus.

3. In a portable weighing apparatus for wagons, the combination with forward and rear load carrying levers, each composed of a shorter and a longer lever arm, said levers having their shorter arms situated to coöperate to support the body of the wagon and the longer arms situated to swing adjacent the forward and rear bolsters, of a shaft extending longitudinally of the wagon and carried by said bolsters, coöperating lever arms secured to said shaft and situated to be connected to operate the load carrying lever arms, a counter lever on said shaft, a weight or scale beam, and means for connecting said counter lever and said scale beam.

4. In a portable weighing apparatus for wagons, the combination with forward and rear load carrying levers, each composed of a longer and a shorter lever arm, said levers having their shorter arms situated to coöperate to support the body of the wagon and their longer arms situated adjacent the forward and rear bolsters, of a shaft extending longitudinally of the wagon, coöperating lever arms secured on said shaft and situated to be operatively connected to the longer arms of said load carrying levers, a counter lever arm on said shaft, a scale beam, links depending from said counter lever arm to connect to said scale beam and means for releasing the counter lever arm and the mechanism connected thereto and said scale beam from the load to be weighed.

5. In a portable weighing apparatus for wagons, the combination with forward and rear load carrying levers composed each of a longer and a shorter lever arm, knife bearing edges on said shorter arms situated to coöperate to support the body of the wagon, and bearing plates situated directly over said knife bearing edges, of an extensible shaft extending longitudinally of said wagon, coöperating lever arms secured on said extensible shaft, links depending from the ends of said coöperating lever arms and connected at their lower ends to the longer arms of the load carrying levers, a counter lever arm, a scale beam, links depending from said counter lever arm to connect to said scale beam, an eccentric journaled in the swinging end of said counter lever arm, an eccentric operating lever, and link pins by said eccentric, substantially as set forth.

6. In a portable weighing apparatus for wagons, the combination with forward and rear load carrying levers. each of which is composed of a shorter and a longer lever arm, said shorter load carrying lever arms situated to coöperate to raise and support the body of the wagon, of an extensible shaft extending longitudinally of the wagon, and composed of a forward tubular portion and a rear portion telescoping into said tubular portion, means connecting said shaft portions to revolve simultaneously, coöperating lever arms, one secured on said tubular portion and one on said telescoping portion of said extensible shaft, links connecting said coöperating lever arms and said longer arms of said load carrying levers, a counter lever arm, a scale beam, and means for lowering said scale beam to release the load carrying levers and the weighing mechanism connected thereto.

In testimony whereof I affix my signature in presence of two witnesses.

JOHN D. REED.

Witnesses:
GEORGE LANDES,
LAWRENCE HOFFMANN.